UNITED STATES PATENT OFFICE.

FREDERICK C. WEBER, OF CHICAGO, ILLINOIS.

ART OF CLEANSING AND IMPROVING THE QUALITY OF IRON AND STEEL.

SPECIFICATION forming part of Letters Patent No. 722,270, dated March 10, 1903.

Application filed September 10, 1901. Serial No. 74,869. (No specimens.)

*To all whom it may concern:*

Be it known that I, FREDERICK C. WEBER, a citizen of the United States, and a resident of the city of Chicago, in the county of Cook and State of Illinois, have invented or discovered certain new and useful Improvements in the Art of Cleansing and Improving the Quality of Iron and Steel, of which the following is a specification.

The improvement relates in a general way to that class of processes which are intended to bring about such changes in iron and steel as to render them better fitted for the various purposes and uses to which they are to be put.

The object of this improvement is to insure more certain and positive results than have hitherto been possible as an outcome of the attempts made in the direction stated.

The discovery or invention is in the nature of a process by which the iron or steel may be cleansed and its quality improved, the process consisting in melting such metals and adding to them when in a molten state metallic borids in the form of ternary or equivalent compounds for causing a chemical reaction and a chemical change, whereby impurities may be eliminated and the basic metals of the borids united with the iron or steel, and otherwise as hereinafter more fully described, and pointed out in the claims.

As found in commerce iron and steel are contaminated with impurities, some of which should be removed and the character of others changed by the process for cleansing and improving them.

The composition and properties of the metals should of course be fairly well understood before proceeding with their treatment to cleanse and improve. A chemical analysis of samples taken from a given brand or lot of metal will disclose its composition with sufficient certainty, and the usual tests of test-bars will show its character.

As oxid of iron and free oxygen are always present in pig-iron and steel and as these metals when in a molten state are true solvents governed by the physical laws which apply to all solvents, these conditions may be taken advantage of in bringing about the needed chemical changes. The oxid of iron and free oxygen being always present in molten metal, react with the nascent boron produced by chemical reaction, which boron was introduced in the form of ternary or binary compounds of metallic borids as equivalents of ternary compounds. The ternary borids are best suited to the purposes of both cleansing and changing the iron and steel, but equivalent results may be obtained by the use of the binary borids, as manganese biborid, along with some alloy of iron, such as that of iron with titanium, manganese, tungsten, nickel, &c.

Impurities—such as baryta, silica, magnesia, alumina, and other earths or foreign substances or matter—are present at times in iron and steel, being derived, in part at least, from the coke and fluxes used in melting these metals. Whatever the nature of the impurities is in any given case it must be taken into account in connection with the materials or substances introduced for the purpose of cleansing and bringing about the desired modification or change, as must also the nature of the materials to be added for the purpose of improving the quality.

Titanium, uranium, tungsten, nickel, chromium, vanadium, &c., possess desirable properties which can be imparted to the iron or steel when they form the basic metals or radicals of the borids to be used either in the form of ternary or binary compounds.

The metallic borids, either as ternary or binary compounds, may be obtained by any suitable process.

The metals to be treated are melted, and the borids are added to the molten metal in such quantity as may be indicated by the composition and character of the metal and the uses to which it is to be put. After the borids are introduced the boron becomes nascent and decomposes the reducible oxids and also combines with the free oxygen, and changes obtain so as to form boric anhydrid, which combines with the impurities and by chemical reaction causes them to form a thin liquid slag or scum, which can readily be removed. At the same time a chemical change takes place by which the basic metals of the borids and alloys are made to unite with the iron or steel under treatment. These results are brought about by the solvent properties of the molten iron and steel, which acting as a solvent of the metallic borids of titanium, tungsten, &c., chemical action occurs and the desired results are obtained.

In the treatment of some metals it is desirable and important to add or combine a larger quantity of the basic metal of the borids than that contained in the metallic borid used and also in some cases to add some other metal. These requirements, if indicated, can be met by the exercise of judgment, so as to bring about the best results, according to the varying needs, by adding the desired metal in the form of an iron alloy. In all cases, however, the boron must be depended upon for reacting chemically upon the contained oxygen and oxids and impurities, while the basic metals of such borids or the added basic metals of the alloys are at the same time acted upon by the molten iron or steel the chemical properties of which are brought into action.

The use of the ternary compound of iron, titanium, and boron enables metal to be produced thereby which is so perfect that when examined with a magnifying-glass not a blowhole, flaw, or blemish will appear or can be found therein. It will be observed that the action of metallic borids in the form of ternary compounds or their binary equivalents is essentially different from other compounds of three or more metals—such as manganese, iron, and silicon, or aluminium, iron, manganese, and boron—in that these borids are far more soluble in molten metal and being true chemical molecules which by their decomposition in the molten metal furnish nascent atoms within the body of the molten metal are most active to bring about chemical change and furnish borate compounds of low fusing-point and good fluxing qualities, which rising rapidly to the surface of the molten metal become of lighter specific gravity and are readily removable.

What I regard as new, and desire to secure by Letters Patent, is—

1. The herein-described process of cleansing and improving the quality of iron and steel, which consists in melting the same, and in adding thereto when in a molten state metallic borids in chemically-equivalent proportions in the form of ternary compounds for causing a chemical reaction and change, whereby impurities may be eliminated and the basic metals of the borids united with the iron or steel, substantially as described.

2. The herein-described process of cleansing and improving the quality of iron and steel which consists in melting the same, adding thereto when in a molten state, ternary metallic borids and an additional quantity of the basic metals of said borids as alloys, whereby impurities may be eliminated by chemical reaction, and the basic metals of the borids and added alloys united with the iron or steel, substantially as described.

3. The herein-described process of cleansing and improving the quality of iron and steel, which consists in melting the same and adding thereto when in a molten state ternary and binary metallic borids, whereby impurities may be eliminated by chemical reaction and the basic metals of the borids united with the iron or steel, substantially as described.

4. The herein-described process of cleansing and improving the quality of iron and steel which consists in melting the same and adding thereto when in a molten state, ternary and binary metallic borids and also alloys of iron, whereby impurities may be eliminated by chemical reaction and the basic metals of the borids, and of the alloys united with the iron or steel, substantially as described.

5. The herein-described process of cleansing and improving the quality of iron and steel, which consists in the employment of ternary borids alone in chemically-equivalent proportions with the contained impurities to be removed from any given metal, whereby the impurities may be eliminated by chemical reaction, substantially as described.

FREDERICK C. WEBER.

Witnesses:
E. M. ELMORE,
J. C. DUFFY.